United States Patent [19]
Vaughn

[11] Patent Number: 6,094,977
[45] Date of Patent: Aug. 1, 2000

[54] BRAKE CYLINDER LEAKAGE TEST METHOD AND DEVICE

[75] Inventor: Lawrence E. Vaughn, Watertown, N.Y.

[73] Assignee: New York Air Brake Corporation, Watertown, N.Y.

[21] Appl. No.: 09/158,500

[22] Filed: Sep. 23, 1998

[51] Int. Cl.⁷ ..................................................... G01L 5/28
[52] U.S. Cl. ................................................................ 73/121
[58] Field of Search .................................................. 73/121

[56] References Cited

U.S. PATENT DOCUMENTS

| | | |
|---|---|---|
| 2,509,816 | 5/1950 | Elson . |
| 2,637,201 | 5/1953 | Meier . |
| 3,351,981 | 11/1967 | Pommer . |
| 3,872,711 | 3/1975 | Atkinson et al. . |
| 3,958,454 | 5/1976 | Rasch . |
| 4,156,864 | 5/1979 | Ingram . |
| 4,440,015 | 4/1984 | Hann ........................................ 73/121 |
| 4,513,604 | 4/1985 | Frantz et al. . |
| 4,755,803 | 7/1988 | Shockley et al. ......................... 73/121 |
| 4,847,770 | 7/1989 | Kane et al. . |
| 5,113,694 | 5/1992 | Sich . |
| 5,509,727 | 4/1996 | Hart et al. . |
| 5,695,258 | 12/1997 | Reie et al. . |

Primary Examiner—Max Noori
Assistant Examiner—Maurice Stevens
Attorney, Agent, or Firm—Barnes & Thornburg

[57] ABSTRACT

A test device and a method of testing leakage of a brake cylinder on a railroad car having a brake pipe and brake valve. The method includes charging the brake pipe, discharging the brake pipe at least at a service rate to actuate the brakes by charging the brake cylinder and simultaneously with charging the brake cylinder charging a reference volume to the brake cylinder pressure. Discharging of the brake pipe is terminated and the pressure in the reference volume is maintained. The difference of pressure between the brake cylinder and the reference volume, at a fixed period after the beginning of maintaining the pressure in the reference volume, is measured to determine the leakage.

36 Claims, 4 Drawing Sheets

6,094,977

BRAKE CYLINDER LEAKAGE TEST METHOD AND DEVICE

BACKGROUND AND SUMMARY OF THE INVENTION

The present invention relates generally to testers for the brake systems of a rail car and more specifically to leakage testing of a brake cylinder.

The American Association of Railroads ("AAR") has recently approved and required the installation and use of a pressure tap for brake cylinder pressure measurement. With this additional requirement, various rules have been promulgated for brake cylinder tests. Rule 88.C.2.c.(1) requires that units be tested to insure that the brakes were applied for a minimum of four hours from a service reduction of brake pipe pressure to zero psi from a 70 psi brake pipe charge. Another proposed test is that the brake cylinder leakage not exceed 4 psi in ten minutes after a 40 psi reduction from a 90 psi brake pipe charge. The leakage test should start 3 minutes after the 40 psi reduction is made. These tests are not only performed in the field, but at the car manufacturers, when the brake equipment is applied to the car.

Various single car testers have been proposed, but none of them have been directed to these new proposed tests. It is also desirable to provide a test which is a simulation of the four hour service brake reduction test that is performed in under an hour.

The present invention is a test device and a method of testing leakage of a brake cylinder on a railroad car having a brake pipe and brake valve. The method includes charging the brake pipe, discharging the brake pipe at least at a service rate to actuate the brakes by charging the brake cylinder and simultaneously with charging the brake cylinder charging a reference volume to the brake cylinder pressure. Discharging of the brake pipe is terminated and the pressure in the reference volume is maintained. The difference of pressure between the brake cylinder and the reference volume, at a fixed period after the beginning of maintaining the pressure in the reference volume, is measured to determine the leakage.

The measuring of the difference to determine the leakage is performed by determining if the difference in pressure is between the reference volume and the brake cylinder after the fixed period is above a preselected value. For a first test, the brake pipe is discharged to zero. The period and the preselected value are selected to simulate a four hour test in under an hour. The fixed period is preferably between four and 30 minutes. For the second test, the brake pipe is discharged or reduced by 40 psi. The pressure in the reference volume is maintained three minutes after termination of discharging. The fixed period is ten minutes.

The car generally includes a car reservoir for charging the brake cylinder and the reference reservoir is also charged from the car reservoir. The determined leakage is compared to a preselected leakage and a determination of pass/fail is made from the comparison. The test is performed using a portable tester which includes the reference volume and ports to be connected to a source of pressure, to the brake pipe and to the brake cylinder.

A leakage tester for a brake cylinder on a railroad car having a brake pipe and a brake valve includes a housing having a source port, a brake port and a brake cylinder port. A first valve connects the source port to the brake pipe port and controls the charging and discharging of the brake pipe. A reference volume is provided and a second valve connects the brake cylinder port and the reference volume and controls the interconnection of the brake cylinder port and the reference volume. A first timer is provided set to a fixed period. A first sensor is connected to the reference volume and the brake cylinder port and determines the pressure difference between the reference volume and the brake cylinder port. A first indicator is connected to the first sensor and the timer and indicates pass/fail at the expiration of the fixed period.

The first valve has a first position connecting the brake pipe port to the source port and a second position connecting the brake pipe port to exhaust. A second valve is connected to the brake pipe port and has a first position connecting the reference volume to the brake cylinder port and a second position disconnecting the reference volume from the brake cylinder port. For the first test, the second valve is in the first position for brake pipe port pressure above a first valve and the second position for brake pipe port pressure below the first valve. For the second test, the second valve is controlled by a second timer to move from the first to the second position at the expiration of the period of the second timer.

A second sensor is connected to the brake pipe port and determines the charging state of the brake pipe. The second sensor may include a flow sensor and a pressure sensor. A second indicator is connected to the second sensor and indicates the charging state of the brake pipe. For the first test, the second sensor is connected to the first timer to initiate the first timer for preselected charge state of the brake pipe. The preselected state is preferably discharged to substantially zero brake pipe pressure. For the second test, the second sensor initiates the second timer and the expiration of the second timer initiates the first timer. The preselected state is a preselected reduction. A third valve connecting the exhaust to the first valve controls the reduction.

A third sensor is connected to the brake cylinder port and determines the charge state of the brake cylinder. Where a third sensor is provided, the second and third sensors are connected to the first timer to initiate the timer for a preselected charge state of the brake pipe and brake cylinder.

A third indicator is connected to the timer and indicates the test start/end. The first indicator is connected to the first sensor and the first timer and indicates pass/fail after expiration of the first timer's period. A latch holds the first indicator in the pass state. The latch is reset after the period in response to recharging the brake pipe port. The timers are also reset after the period in response to recharging the brake pipe port. The fixed period is between four and 30 minutes, and the period, the sensor and the indicator simulate a four hour leakage test in under an hour. For the second test, the second timer's period is at least 3 minutes and the first timer's period is at least 10 minutes.

The tester is portable and weighs less than 50 pounds. The reference volume is in the housing. An on/off switch is provided in series with a battery and connected in circuit with the timer, sensor and indicator.

Other objects, advantages and novel features of the present invention will become apparent from the following detailed description of the invention when considered in conjunction with the accompanying drawings.

DETAILED DESCRIPTION OF THE PROFFERED EMBODIMENTS

Figure 1:
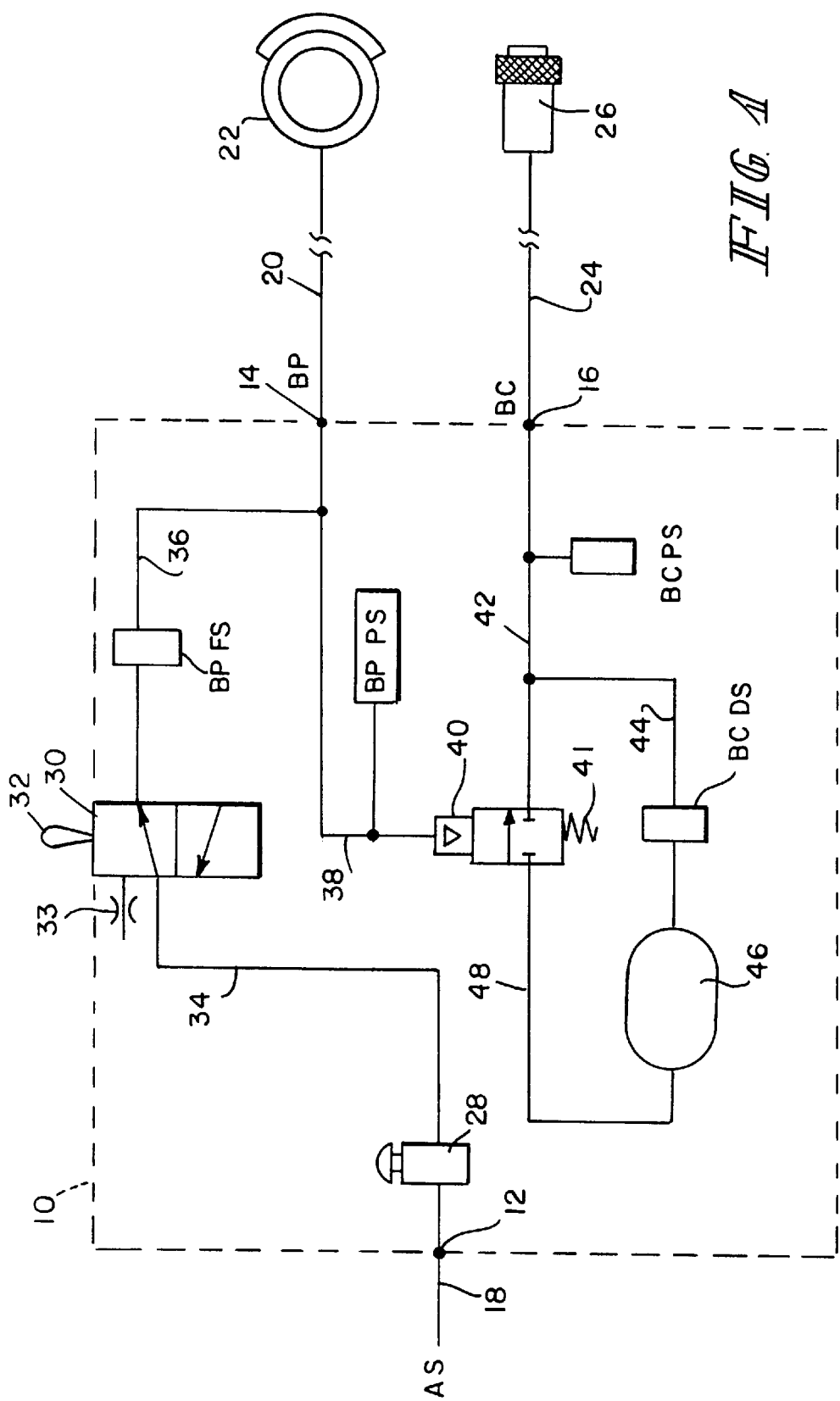
FIG. 1 is a schematic of the pneumatic portion of a first embodiment of the leakage tester according to the principles of the present invention.
Figure 2:
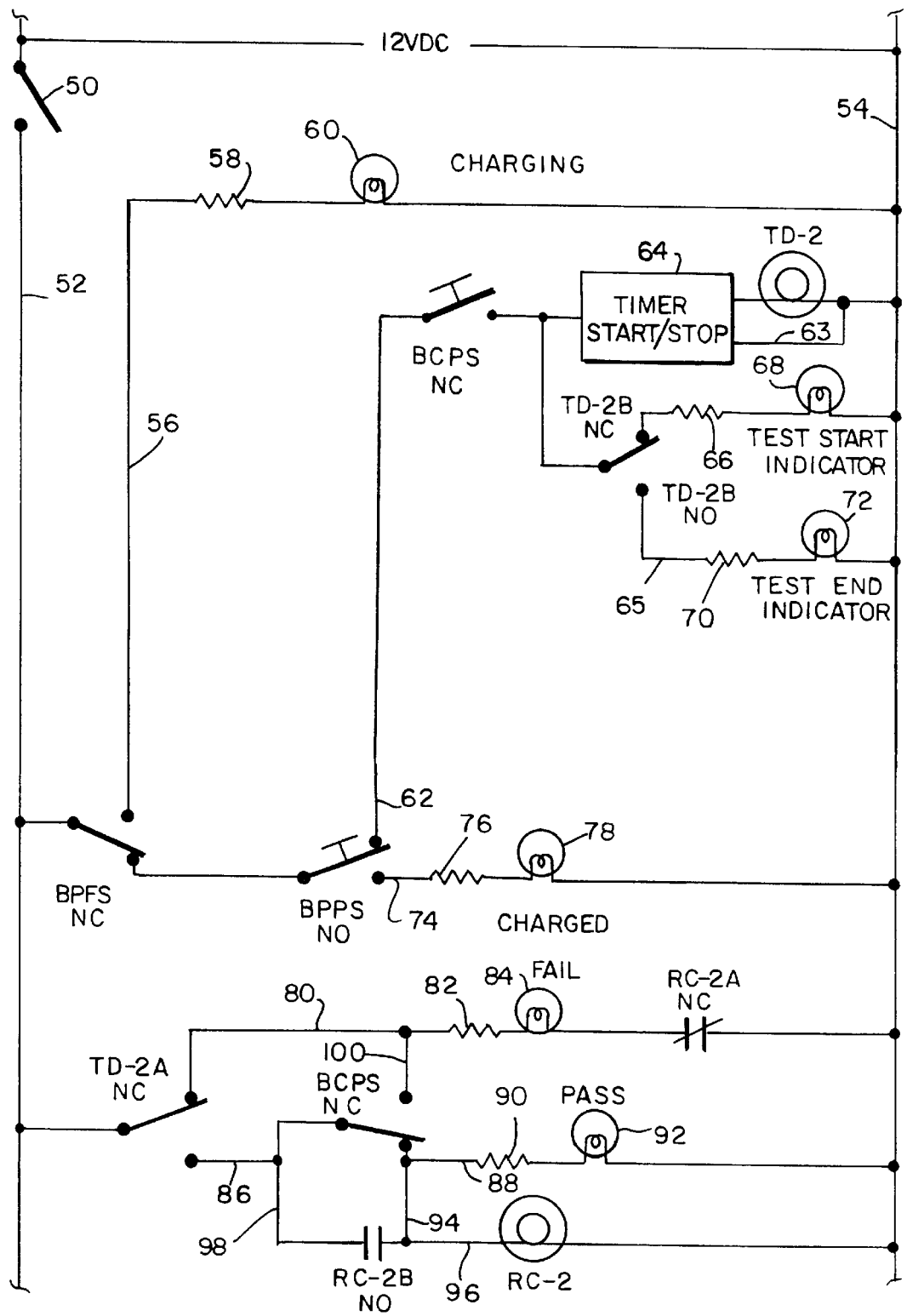
FIG. 2 is a schematic of the electrical portion of a first embodiment of a leakage tester according to the principles of the present invention.

A leakage tester for a brake cylinder of railroad car having a brake pipe and a brake valve is illustrated in FIGS. 1 and 2. Included within housing 10 is the pneumatics of FIG. 1 and the electronics of FIG. 2. The housing 10 includes an air supply port 12, a brake pipe port 14 and a brake cylinder port 16. A line 18 extending from the air supply port 12 is to be connected to an air supply AS. The brake pipe port 14 is connected by a line 20 to a brake pipe BP. As illustrated, the end of line 20 may include a mating portion 22 for a glad hand of the brake pipe of the car. The brake cylinder port 16 includes a line 24 terminating with a quick disconnect 26 to be connected to a brake cylinder test port on the car. The brake cylinder test port may be at any location provided on the brake system of the car. The location of the brake cylinder test port may be on the control valve, the brake cylinder or the empty/load device if one is included in the brake system.

A regulator 28 connects the air supply port 12 to a manually activated valve 30 via line 34. A handle 32 allows positioning the valve 30 from its first position connecting the air supply port 12 to the brake pipe port 14 via regulator 28, line 34 and line 36. This charges the brake pipe. The second position of valve 30 connects the brake pipe to exhaust through a restriction 33. This discharges the brake pipe. Valve 30 may have a lap or lock position, but this is not needed to function. Depending upon the test, the restriction 33 would simulate a service rate of discharge of the brake pipe.

Provided in line 36 is a brake pipe flow sensor BPFS. A line 38 connects the brake pipe port 14 to a piloted valve 40 which includes spring 41. Also, a brake pipe pressure sensor BPPS is connected to line 38. The brake pipe flow sensor BPFS provides an indication of the flow or charge and discharge rate of the brake pipe. For the implementation of FIG. 2, the brake pipe flow sensor is nondirectional and sense only charging. A directional sensor could be used to indicate charging and discharging of the brake pipe. The brake pipe pressure sensor BPPS provides an indication of the brake pipe pressure.

Line 42 connects the brake cylinder port 16 to the valve 40. Line 44 connects the brake cylinder port 16 to a brake cylinder differential sensor BCDS via line 44. The brake cylinder differential sensor BCDS is also connected to a reference volume 46. Line 48 connects volume 46 to the piloted valve 40. Also connected to the brake cylinder port via line 42 is a brake cylinder pressure sensor BCPS. The piloted valve 40 shown in its unpiloted position disconnects the reference volume 46 from the brake cylinder port 16. In the piloted position, when the brake pipe pressure is above the given value determined by spring 41, the brake cylinder port 16 is connected to the reference volume 46 via lines 42, valve 40 and line 48.

A brake cylinder leakage test is performed by connecting air supply port 12 to an air supply AS, port 14 to the brake pipe using for example, glad hand 22 and the brake cylinder to the brake cylinder port 16 via disconnect 26. The valve 30 in the shown position charges the brake pipe. The brake pipe flow sensor BPFS and the brake pipe pressure sensor BPPS senses the charging of the brake pipe. Also, after a given pressure is provided in the brake pipe, valve 40 moves to its second position connecting the reference volume 46 to the brake cylinder. A control valve on the car in response to a charging of the brake pipe releases the brake cylinder. Thus, the pressure in the reference volume 46 should be zero. Once the brake pipe is adequately charged, the brake pipe flow sensor BPF should sense a low or minimal flow.

Next, the valve 30 is moved to its test position discharging the brake pipe at a service rate through restriction 33. Again, the brake pipe pressure sensor BPPS detect the discharging of the brake pipe. With a discharging of the brake pipe, the control valve on the car will begin to charge the brake cylinder from a car reservoir to apply the brakes. The same reservoir on the car which charges the brake cylinder also charges reference volume 46 through lines 42, valve 40 and line 48. Once the brake pipe is discharged to a preselected value, the valve 40 will move to its unpiloted position by spring 41 disconnecting the reference volume 46 from the brake cylinder port 16. The brake cylinder differential sensor BCDS will then sense the difference between the charged brake cylinder pressure as stored in reference volume 46 against the brake cylinder pressure at port 16. If a standard four hour test was to be conducted, the value sensed by the brake cylinder differential sensor BCDS would be measured after the four hours.

It has been found by experimentation that a leakage rate of approximately 100 cu. in. per minute would produce acceptable results in a four hour test. A four hour test can be simulated in a shorter period of time, for example, under an hour, by measuring the differential pressure in the time period preferably between 4–30 minutes. For example, if the test was conducted for five minutes after the brake pipe has been discharged to a predetermined level, acceptable difference in pressure between the reference volume 46 and the brake cylinder pressure brake cylinder port 16 would be below a 2 psi differential. Since the four hour brake cylinder test of AAR Rule 88.C.2.c(1) is a four hour test for service reduction brake pipe to zero psi, spring 41 is selected such that it cuts off the connection between the brake cylinder port 16 and the reference volume 46 at, for example, 5 psi.

An electronic system to provide a pass/fail indication is illustrated in FIG. 2. Since this example does not require a specific measurement of the brake cylinder pressure, the brake pipe flow sensor BPFS, the brake pipe pressure sensor BPPS, the brake cylinder pressure sensor BCPS and the brake cylinder differential sensor BCDS, may be switches to provide a qualitative value. If a quantitative value is required, these sensors may be sensors and not switches. Schematic FIG. 2 provides a simulation of a four hour test in for example, a range of 4–30 minutes. An example is provided for the five minute example previously described for the pneumatic circuit of FIG. 1.

An on/off switch 50 is connected in power line 52. The brake pipe flow sensor BPFS is shown in its normally closed position. When the brake pipe flow sensor senses flow during a charging state, the switch BPFS is moved to connect power line 52 to line 56. Line 56 includes a resistor 58 and a charging indicator 60. The resistor 58 and the charging indicator 60 are connected between lines 52 and 54, and the indicator 60 is lit when the brake pipe flow sensor BPFS senses a charging of the brake pipe.

When the brake pipe is fully charged, the brake pipe flow sensor switch BPFS is in its shown position connecting line 52 to the brake pipe pressure sensor switch BPPS which is shown in its normally open position. In its normally open position, the brake pipe pressure sensor switch BPPS connects line 52 to line 62. For example, the brake pipe pressure sensor with BPPS may be set, for example, to remain in its normally open position until it reaches a minimum pressure value, for example, 5 psi. When the brake pipe pressure exceeds 5 psi, the BPPS is moved to a second position connecting line 52 to line 74. Line 74 include resistor 76 and a charged indicator 78. Thus, once the brake pipe flow sensor BPFS senses substantially zero flow and the brake pipe pressure sensor BPPS indicates that the brake pipe is above 5 psi, the charging indicator 60 is extinguished and the charged indicator 78 is lit.

To begin the test after charging the brake pipe, the brake pipe is discharged to create an application of the brakes. Since BPFS is monodirectional to sense only charging, it remains in the position shown in FIG. 2. If it were bidirectional, it would move from the position shown in FIG. 2 until the flow is substantially zero. Since at this time the brake pipe will be below the value of the brake pipe pressure switch BPPS, brake pipe BPPS will not be connected to line 74 and will be connected to line 62 as shown in FIG. 2.

The brake cylinder will be applied by the control valve in the car in response to the discharging brake pipe. The brake cylinder pressure switch BCPS is shown in its normally open position. When the brake cylinder pressure exceeds a given value, for example, above 60 psi, the brake cylinder pressure switch BCPS will close connecting a timer 64 between lines 52 and 54 via the brake pipe flow sensor BPPF, brake pressure sensor BPPS, line 62, brake cylinder pressure sensor BCPS and line 63. Connected to the output of timer 64 is a timer relay TD2. When the timer times out or expires, it will activate relay TD2.

The time delay relay TD2 controls a first set of contacts, TD2B which is connected via line 65 to the brake cylinder pressure switch BCPS. The contacts TD2B are shown in their normally closed position when the time relay TD2 is not activated nor timed out after a fixed period. In the position shown, line 65 is connected to resistor 66 and test start indicator 68. If the brake cylinder pressure sensor BPPS is not closed, indicator 68 is not lit. When TD2 is activated, line 65 is connected through resistor 70 to test end indicator 72. Thus, when the brake pipe is fully discharged, a) the brake pipe flow sensor BPFS and the brake pipe pressure sensor BPPS are in the position shown and b) the brake cylinder pressure BCPS is in the closed position and c) the time has not expired, then the test start indicator 68 is lit. Once the timer 64 reaches the end of its fixed period, the time delay relay TD2 is activated, causing the contacts TD2B to move to the down position extinguishing indicator 68 and turning on indicator 72 indicating the end of the test.

The time delay relay TD2 has a second set of contacts TD2A, connected either to line 80 or line 86. When TD2 is deactivated, contacts TD2A are in its normally closed position connecting line 52 to line 80. Connected to line 80 is resistor 82 and a fail indicator 84 and normally closed relay contacts RC2A. Thus, when the system is actuated by the on/off switch 50 being closed, indicator 84 is lit. Once the test period has expired and the time delay relay TD2 is actuated, the contacts TD-2A is moved to the down position connecting line 52 to line 86. This temporarily extinguish the fail indicator 84. Line 86 is connected to the brake cylinder differential switch BCDS shown in its normally open position.

In the position shown in FIG. 2, line 86 is connected to line 88 which includes resistor 80 and pass indicator 92. Line 86 is also connected by line 94 to line 96 which includes relay RC2 which controls the contacts RC2A which are in line 80 and RC2B which are in line 98. RC2B is shown in its normally open position. Relay RC2 is a latch relay to hold the pass indicator 92 on position as will be explained. BCDS in its second position connects line 86 to line 100 which is connected to line 80 and the fail indicator 84.

In the example given, BCDS is a differential switch set, for example, to 2 psi differential. Thus, if the differential between the reference volume 46 and the brake cylinder port 16 is under 2 psi, switch BCDS will remain in its down position connecting line 86 to lines 88 and 96. If the time has expired and the time delay relay contacts TD2A are in the down position, this connects the pass indicator 92 and the latch relay RC2 between lines 52 and 54. Relay RC2 then opens the normally closed contacts RC2A disconnecting line 80 and fail indicator 84 from the power lines 52 and 54 and closes normally open contacts RC2B. The latch provides an accurate measurement of the pass/fail condition of the brake cylinder leakage under test at the expiration of the preselected time period.

As time goes on, the pressure at the brake cylinder port 16 will decrease and therefore the differential switch may exceed, for example, 2 psi. Without the latch relay RC2 and its contacts RC2B, the brake cylinder differential switch BCDS would move to its up position connecting line 86 to line 100. This would extinguish pass light 92, deactivate relay RC2 and activate the fail light 84. This is an undesirable result. By using the latch relay RC2, contacts RC2B remain closed if the pressure differential is a pass with a direct connection of the relay RC2 to line 86 independent of the position of the brake cylinder differential switch BCDS, after expiration of the timer. Also, the contacts RC2A prevents activation of the fail indicator for as the brake cylinder differential switch BCDS moves to connect line 86 with line 100.

It should be noted that the time delay relay contacts TD2A may only be connected to line 86 or to an opening, and not to line 80. This would not change the operation of the pass/fail, but would only not activate fail indicator 84 prior to the expiration of the time delay.

The timer 64, test end indicator 72 and pass 92/fail 84 indicators remain in their condition until reset. Recharging the brake pipe to release the brake cylinder will move the brake pipe flow sensor BPFS to line 56. This resets timer 64 deactivating relay TD2. This moves contacts TD2A up to line 80 unlatching relay RC2. The tester is thus reset. Opening on/off switches 50 will also reset the tester and timer.

The brake cylinder differential switch BCDS is in the position shown for less than two psi, it is between lines 88 and 100 for two psi and is connected to line 100 for greater than two psi. Thus, if neither of the fail indicator light or the green indicator light is on, the test is considered inconclusive or should be considered a failure. The brake cylinder differential switch BCDS provides a comparison of the differential pressure to a preselected value.

The examples of a five minute test and a two pound differential for brake cylinder differential switch BCDS is just one example of time and value to produce to test for a particular leakage rate. The time of anywhere from four to 30 minutes may be used and the appropriate selection of the differential pressure to produce an acceptable leakage rate which would simulate a four hour brake cylinder leakage test in less than an hour. Also, since the test is for service reduction of four hours from reduction to zero brake pipe, the value of zero for the brake pipe flow sensor BPFS and the five pounds for brake pipe pressure sensor BPPS are selected.

Figure 3:
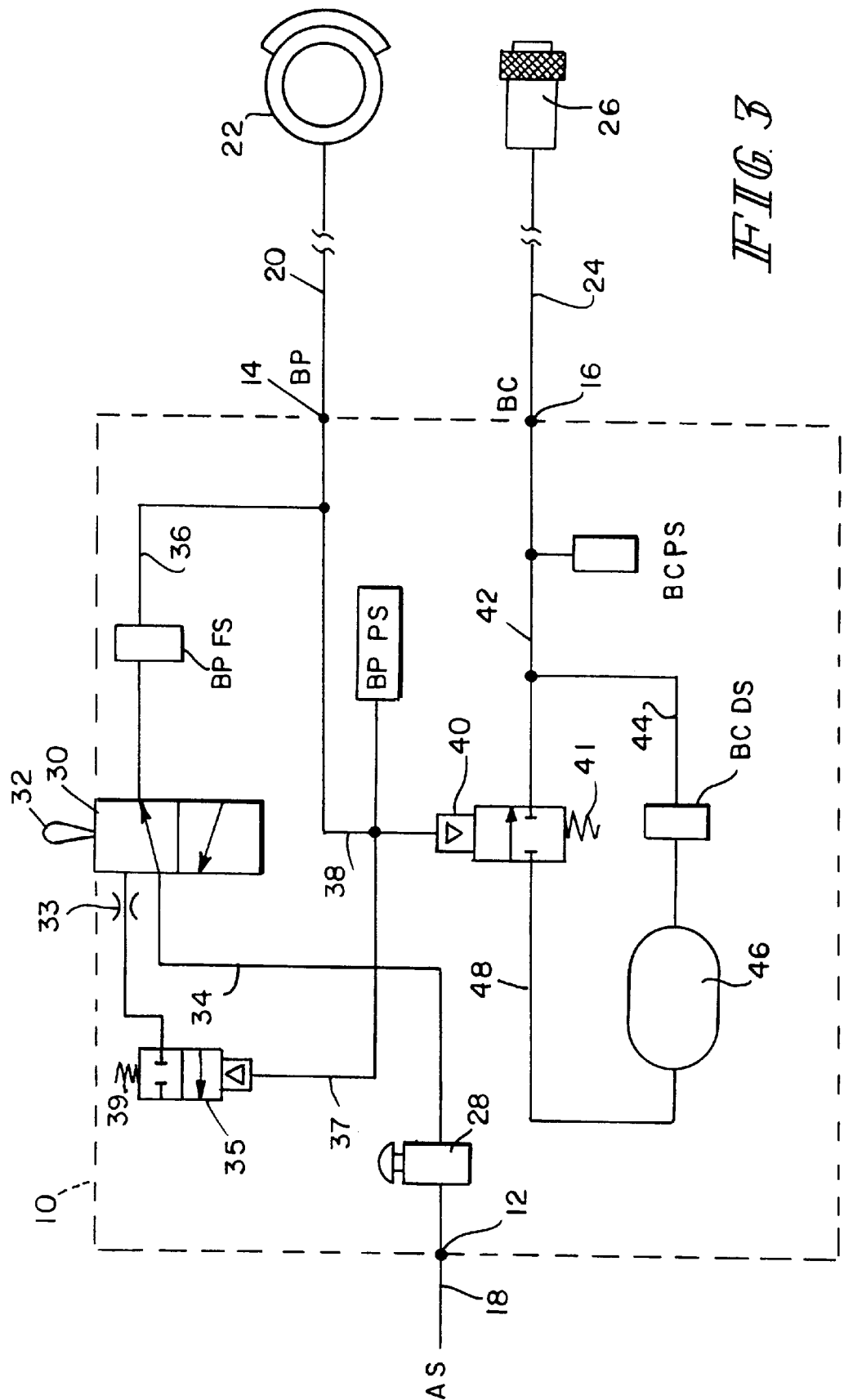
FIG. 3 is a schematic of the pneumatic portion of a second embodiment of the leakage tester according to the principles of the present invention.
Figure 4:
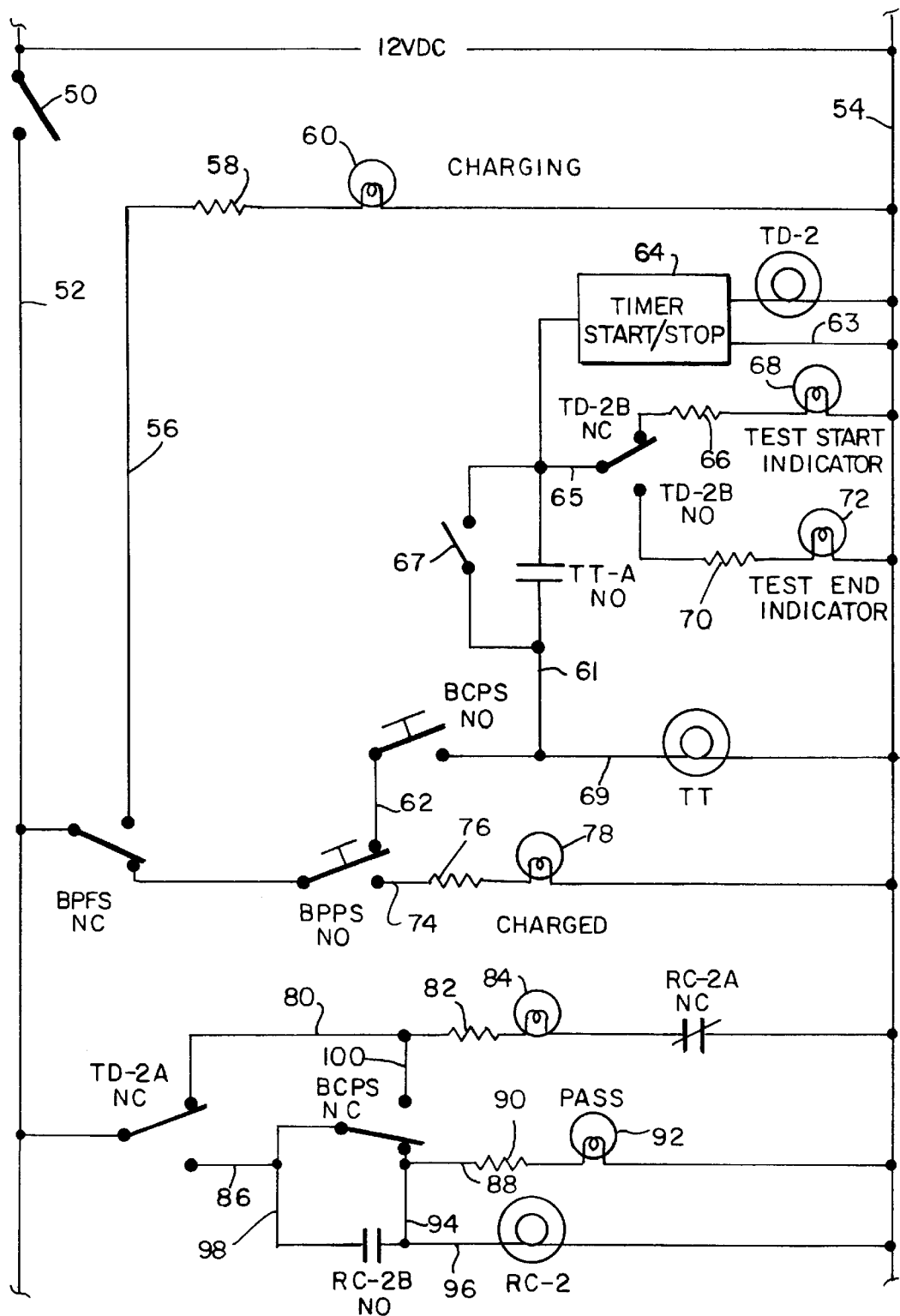
FIG. 4 is a schematic of the electrical portion of a second embodiment of a leakage tester according to the principles of the present invention.

If other tests are to be run, the brake pipe flow sensor BPFS, the brake pipe pressure sensor BPPS, the brake cylinder sensor BPPS and the brake cylinder differential sensor BCPS may be set to other values. For example, the present system may be used to perform the new proposed test Rule 88.C.2.c(1), namely not to exceed four psi in 10 minutes after a 40 psi reduction from a 90 psi brake pipe charge. Also, the test must start at least three minutes after the 40 psi reduction is made. A second embodiment is illustrated in FIGS. 3 and 4. All of the elements which are common to the circuitry of FIGS. 1 and 2 have the same reference numbers.

Since the test to be performed is to monitor the leakage for a 40 psi reduction from a 90 psi brake charge, a piloted cut-off valve 35 is connected between the restriction 33 and atmosphere to control the amount of discharge of the brake pipe. Line 37 connects the brake pipe port 14 and line 38 as the pilot control for valve 35. Spring 39 is set such that for pressure below 50 pounds, valve 35 will cut off the discharging of the brake pipe. For pressures above 50 pounds, the brake pipe is connected to the atmosphere through valve 30, line 36, and brake pipe port 14. Similarly, spring 41 for valve 40, which cuts off the connection between the brake cylinder port 16 and the reservoir 46 and thereby retain a reference pressure in the reservoir 46, is also set for 50 pounds. The brake cylinder pressure will equalize to the desired value by the time the brake pipe has hit 50 pounds.

Another solution would make valve 40 a solenoid valve driven by the three minute timer. Also, the tester could be automatic such that you push a button to start the test which would automatically cycle through a charging and then a discharging. This controller would also produce the appropriate cut-off for a 40 psi drop without the use of the additional valve 35. Valve 30 would be a solenoid valve. The use of additional electronic elements increase the power drain and may limit the tester's use in the field.

As noted in FIG. 4, the brake pipe pressure sensor BPPS will be in a normally closed position connecting a power line 52 to lines 62 for pressures below 50 psi and to be connected to line 74 and the charge indicator 78 for-brake pipe pressures above 50 psi.

In lines 61, between the brake cylinder pressure sensor BCPS and the timer circuit 64 and line 65, is normally open contacts TT/A of a time relay TT which is in line 69 between the switch BCPS and the power line 54. For the test where the ten minutes time is not to begin until the three minutes after pressure has dropped 40 psi, the timer TT would be a three minute timed relay. Timer TT will close contacts TT/A to start the timer circuit 64 after three minutes. Timer 64 would then be set for 10 minutes to activate time delay relay TD2 and at the end of ten minutes, the test end indicator 72 would be lit and one of the pass/fail indicators 84 and 92 would be lit depending on the differential pressure. The brake cylinder differential pressure switch BCDS would then be set for 4 psi since that is the test differential value after the ten minutes. BCPS would be set at 60 psi and acts as an interlock that insures the brake cylinder has charged to a high level for the test. This test will function without BCPS.

The timer 64, the brake cylinder differential switch DCDS, and the brake pipe pressure switch BPPS would be adjustable. Also, a bypass switch 67 would bypass the open contacts TT/A such that the three minute timer relay TT would have no effect when the first test is run simulating the four hour leakage test. The various valves 35 and 40 would not have springs 39 and 41 but would be solenoid valves controlled at set pressures sensed by the brake pipe pressure sensor BPPS and/or the brake cylinder pressure sensor BCPS.

Although the system is shown with relays and mechanical pressure switches, the system may also use integrated circuits and appropriate digital logic.

The test device of the present invention is a portable device. The housing 10 would generally be no larger than 4 cubic feet and a total weight would be approximately 25 pounds.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A method of leakage testing of a brake cylinder on a rail car having a brake pipe and having a brake control valve in communication with the brake cylinder, the method comprising:
   charging the brake pipe;
   discharging the brake pipe at least at a service rate thereby actuating the brakes by charging the brake cylinder;
   simultaneously with charging the brake cylinder, charging a reference volume to the brake cylinder pressure;
   terminating the discharging of the brake pipe;
   maintaining the pressure in the reference volume; and
   measuring a difference between the pressure in the brake cylinder and the pressure in the reference volume a fixed period after beginning the maintaining of the pressure in the reference volume to determine an amount of leakage.

2. A method according to claim 1, wherein the brake pipe discharge is terminated at substantially atmospheric pressure.

3. A method according to claim 1, wherein the step of measuring the difference to determine the amount of leakage is performed by determining if the difference between the pressure in the reference volume and the pressure in the brake cylinder after the fixed period exceeds a preselected value.

4. A method according to claim 3, including selecting the period and the preselected value to simulate a four hour test in under an hour.

5. A method according to claim 1, wherein the fixed period for the measurement is between four and thirty minutes.

6. A method according to claim 1, wherein the step of discharging the brake pipe is performed by reducing the pressure in the brake pipe by 40 psi.

7. A method according to claim 1, wherein the step of maintaining the pressure in the reference volume begins at least three minutes after terminating the discharge of the brake pipe and the fixed period for measuring the pressure difference is at least ten minutes.

8. A method according to claim 1, wherein the car includes a car reservoir and the brake cylinder and the reference volume are charged from the car reservoir.

9. A method according to claim 1, wherein the test is performed using a portable tester including the reference volume; and including connecting the portable tester to a source of pressure, the brake pipe and the brake cylinder.

10. A method according to claim 1, further including the step of comparing the determined amount of leakage to a preselected amount of leakage and determining pass/fail from the comparison.

11. A leakage tester for a brake cylinder on a rail car having a brake pipe and having a brake control valve in communication with a brake cylinder, the tester comprising:
  a housing having a source port, a brake pipe port and a brake cylinder port;
  a first valve connected to the source port and the brake pipe port and controlling the charging and discharging of the brake pipe;
  a reference volume;
  a second valve connected to the brake cylinder port and the reference volume and controlling the interconnection of the brake cylinder port and the reference volume;
  a timer set to a fixed period;
  a first sensor connected to the reference volume and the brake cylinder port to determine a difference between pressure in the reference volume and the pressure at the brake cylinder port; and
  a first indicator connected to the first sensor and the timer and indicating pass/fail after expiration of the period.

12. A tester according to claim 11, wherein the first valve has a first position connecting the brake pipe port to the source port and a second position connecting the brake pipe port to exhaust.

13. A tester according to claim 11, wherein the second valve is connected to the brake pipe port and has a first position connecting the reference volume to the brake cylinder port when brake pipe port pressure exceeds a first value and a second position disconnecting the reference volume from the brake cylinder port when the brake pipe port pressure is below the first value.

14. A tester according to claim 11 including a second sensor connected to the brake pipe port and determining the charge state of the brake pipe.

15. A tester according to claim 14, wherein the second sensor includes a flow rate sensor and a pressure sensor.

16. A tester according to claim 14, including a second indicator connected to the second sensor and indicating the charge state of the brake pipe.

17. A tester according to claim 14, wherein the second sensor is connected to the timer to initiate the timer for preselected charge state of the brake pipe.

18. A tester according to claim 14, wherein the second sensor is connected to the timer to initiate the timer when the brake pipe port is discharged to substantially zero.

19. A tester according to claim 14, a third sensor connected to the brake cylinder port and determining the charge state of the brake cylinder.

20. A tester according to claim 19, wherein the second and third sensors are connected to the timer to initiate the timer for preselected charge states of the brake pipe and brake cylinder.

21. A tester according to claim 11, including a second indicator connected to the timer and indicating test start/end.

22. A tester according to claim 11, wherein the first indicator indicates fail during the period and indicates pass/fail after expiration of the period.

23. A tester according to claim 11, including a latch holding the first indicator in pass.

24. A tester according to claim 23, wherein the latch is reset after the period in response to recharging the brake pipe port.

25. A tester according to claim 11, wherein the first indicator is reset after the period in response to recharging the brake pipe port.

26. A tester according to claim 11, wherein the timer is reset after the period in response to recharging the brake pipe port.

27. A tester according to claim 11, wherein the fixed period is between four and thirty minutes.

28. A tester according to claim 11, wherein the period, the sensor and the indicator simulate a four hour test in under an hour.

29. A tester according to claim 11, wherein the reference volume is in the housing.

30. A tester according to claim 11, wherein the tester is portable and weighs less than fifty pounds.

31. A tester according to claim 11, including an on/off switch in series with battery and connected in a circuit with the timer, sensor and indicator.

32. A tester according to claim 12, including a third valve connecting the first valve to exhaust and responsive to brake pipe pressure to control the discharging of the brake pipe to a predetermined value.

33. A tester according to claim 32, wherein the brake pipe is discharged 40 psi.

34. A tester according to claim 14, including a second timer set to a fixed second period and connected to and initiated by the second sensor for a preselected charge state of the brake pipe; and wherein the first timer is initiated by the second timer at the expiration of the second period.

35. A tester according to claim 34, wherein the second time period is at least three minutes after terminating the brake pipe discharging and the fixed period of the first timer for the measurement is at least ten minutes.

36. A tester according to claim 34, wherein the second valve is connected to the brake pipe port and has a first position connecting the reference volume to the brake cylinder port during the second period and a second position disconnecting the reference volume from the brake cylinder port at the expiration of the second period.

* * * * *